United States Patent [19]

Feifel

[11] Patent Number: 4,641,796
[45] Date of Patent: Feb. 10, 1987

[54] AIRFOIL

[75] Inventor: Winfried M. Feifel, Seattle, Wash.

[73] Assignee: The Boeing Company, Seattle, Wash.

[21] Appl. No.: 537,843

[22] Filed: Sep. 30, 1983

[51] Int. Cl.⁴ .............................................. B64C 3/14
[52] U.S. Cl. ................................... 244/35 R; 244/123
[58] Field of Search .................. 244/35 R, 35 A, 130, 244/123

[56] References Cited

U.S. PATENT DOCUMENTS

| | | |
|---|---|---|
| 1,081,467 | 12/1913 | Reimers . |
| 1,438,685 | 12/1922 | Belcher . |
| 1,467,699 | 9/1923 | Vinding et al. . |
| 1,470,017 | 10/1923 | Lougheed ............... 244/35 R |
| 1,571,989 | 2/1926 | Zimmerman . |
| 1,804,823 | 5/1931 | Blodin . |
| 2,060,859 | 11/1936 | Flynt . |
| 2,126,502 | 8/1938 | Redlinger ............... 244/35 R |
| 2,408,688 | 10/1946 | Ludington et al. . |
| 2,562,227 | 7/1951 | Zobel . |
| 2,643,076 | 6/1953 | Hurel . |
| 2,898,059 | 8/1959 | Whitcomb . |
| 3,199,813 | 8/1965 | Roper . |
| 3,476,336 | 11/1969 | Hertel . |
| 3,635,590 | 1/1972 | Phillips . |
| 3,697,193 | 10/1972 | Phillips . |
| 3,706,430 | 12/1972 | Kline et al. . |
| 3,915,106 | 10/1975 | De Witt . |
| 3,934,533 | 1/1976 | Wainwright . |
| 3,952,971 | 4/1976 | Whitcomb . |
| 4,067,518 | 1/1978 | Paterson et al. . |
| 4,072,282 | 2/1978 | Fulker et al. . |
| 4,311,289 | 1/1982 | Finch . |

FOREIGN PATENT DOCUMENTS

| | | |
|---|---|---|
| 569187 | 1/1933 | Fed. Rep. of Germany .... 244/35 R |
| 1923535 | 1/1970 | Fed. Rep. of Germany . |
| 2428537 | 1/1976 | Fed. Rep. of Germany . |
| 477206 | 10/1915 | France ............... 244/35 R |
| 1079083 | 11/1954 | France . |
| 1368753 | 6/1964 | France . |
| 331458 | 11/1935 | Italy . |
| 127398 | 6/1919 | United Kingdom . |
| 402514 | 12/1933 | United Kingdom ............ 244/35 R |

OTHER PUBLICATIONS

*NASA Facts,* "Laminar Flow Control Technology", NF-86, Aug. 1979.
NASA Technical Note 3871, R. L. Maki and L. W. Hunton, Dec. 1956.
Bioengineering-An Engineering View, H. Hertel, Edited by George Bugliarello, copyright 1968.
Low Speed Wind Tunnel Testing, A. Pope and J. J. Harper.
"Laminar Flow Control", W. D. Harvey & J. D. Pride, Sep. 17-18, 1981.
"Design Considerations of Advanced Supercritical Low Drag Suction Airfoils", Pfenninger et al., Nov. 7-8, 1979.
"CTOL Transport Technology", NASA Conference Publ. #2036, D. O. Allison and J. R. Dagenhart, Feb. 28-Mar. 3, 1978.

Primary Examiner—Sherman D. Basinger
Assistant Examiner—Rodney Corl
Attorney, Agent, or Firm—Hughes & Cassidy

[57] ABSTRACT

An airfoil member having an upper surface contoured to create lift. The lower airfoil surface has a lower forward surface portion which, in a rearward direction, curves concavely into an expanded convexly curved lower surface belly portion. This enables a primary load carrying member (e.g. a spar) to be located in the belly section and have a relatively greater depth, without unnecesary sacrifice of aerodynamic performance. In another embodiment, both the upper and lower surfaces of the airfoil are contoured with the expanded belly portion.

38 Claims, 23 Drawing Figures

DESIGN COND. II (HIGH ANGLE OF ATTACK) ---- $C_L = 0.92$
DESIGN COND. I (LOW ANGLE OF ATTACK) —— $C_L = 0.4$

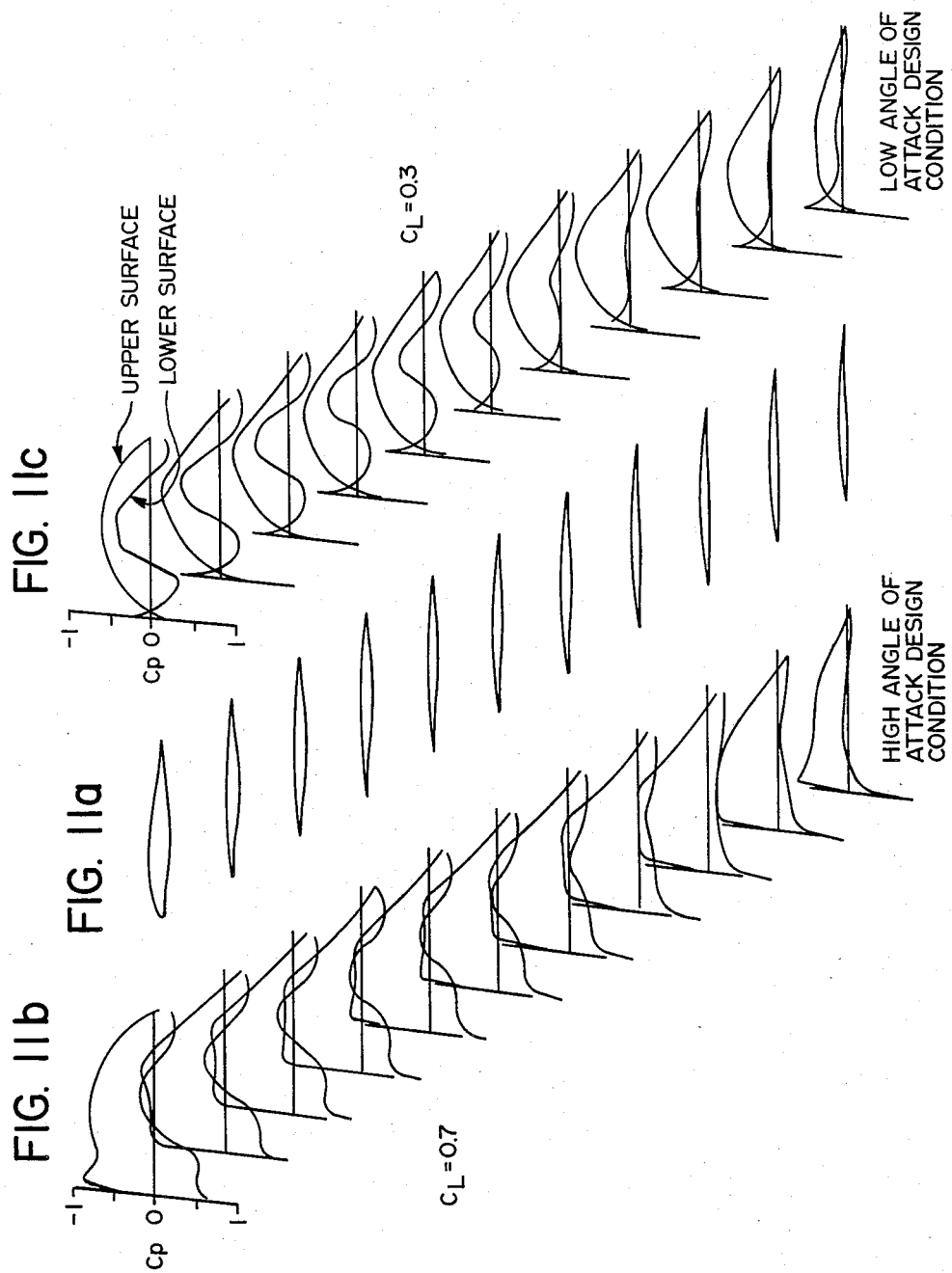

AIRFOIL

BACKGROUND OF THE INVENTION

1. Field of the Invention

The present invention relates generally to an airfoil, and more particularly to an airfoil configuration which provides a desirable balance between structural and aerodynamic considerations relative to particular airfoil requirements.

2. Background Art

It is well known that, as a general rule, for a given wing area the wing lifting capability is reduced when the wing section cross-sectional area, which roughly correlates with wing maximum thickness, is increased. The effects of wing thickness on lift are especially detrimental when the maximum velocity at the wing upper surface is dictated by the requirement that it be no more than, for example, 1.2 times the local speed of sound, or is limited by the onset of cavitation. Such a limit on thickness is typically set for most high speed subsonic aircraft to avoid Mach shock wave drag, and this is the reason why such aircraft are equipped with relatively thin wings in comparison with thicker wings that can be used in lower speed aircraft.

However, for structural reasons, the wing of an aircraft must have a certain amount of thickness (i.e. depth dimension) so that it can properly carry the loads imposed thereon. The primary load carrying structure of a wing is customarily a spar which extends along the length of the wing (i.e. along the spanwise axis) from the inboard end to the outboard end thereof. In effect, the spar is a cantilevered beam, with the bending moments being greatest at the inboard end where it is connected to structure in the fuselage. If the thickness of the wing is to be reduced, this would necessarily require the depth of the spar to be diminished accordingly. As a general rule, the strength of a spar increases or decreases roughly in proportion to the square of its height, and the strength of the spar is generally directly proportional to spar width (i.e. the dimension parallel to the chord-wise axis of the wing).

Thus, it can be appreciated that the structural requirements of the wing are in a sense in conflict with the aerodynamic requirements. On the one hand, strength can be obtained for a given mass of spar material by increasing the thickness of the wing. However, this is generally accomplished at the expense of aerodynamic performance of the wing.

Another consideration is the amount of space that the load carrying structure (i.e. the spar) occupies in the wing. For some applications, it is desirable that the wing primary load carrying structure occupy a relatively small portion of the wing chord length, with the leading and trailing edge portions forward and rearwardly of the spar being "non-structural". As applied to the leading and trailing edge regions, the term "non-structural" refers to the negligible structural contribution these areas make to the overall wing bending and tortion stiffness and strength. Such "non-structural" areas of the wing, however, must have sufficient structural integrity to transmit local airload sheer and moment in a chord-wise direction to the spar while the spar is at its maximum spanwise bending deflection.

Since, as indicated previously, the strength of the spar in resisting bending moments is generally proportional to the square of the height, and proportional directly to the width (i.e. dimension parallel to the chord-wise axis of the wing), it can be appreciated that a percentage increment of increase in the height of the spar can permit a correspondingly greater percentage increment of decrease in the width of the spar, and yet achieve substantially the same structural strength and rigidity. Therefore, if it is desired to decrease the width of the spar so as to increase the non-structural space in the leading and trailing edge regions of the wing, one logical approach would be to increase the height of the spar where greater structural strength is needed. However, as indicated previously, since an increase in spar height would generally mean a corresponding increase in wing thickness, in general, the increase in spar height would mean a loss in aerodynamic performance.

There could be a variety of reasons for increasing the size of non structural regions of the leading and trailing edges. For example, it may be desired to house such items as antennas and sensors in the non-structural areas. Also, it may be desired to vary the camber of the wing over a greater chord length, and this would require "non-structural" components in the region of variable camber.

In view of the foregoing, it is a general object of the present invention to provide an airfoil where the primary load bearing structure has relatively high strength relative to overall weight and width dimension (i.e. the dimension parallel to the chord-wise axis of the airfoil), and yet have an airfoil which is contoured to accommodate such primary structure without unnecessarily compromising aerodynamic performance.

SUMMARY OF THE INVENTION

The airfoil of the present invention has a leading edge, a trailing edge, an upper surface, a lower surface, a chord-wise axis and a spanwise axis. At a chord-wise location on said spanwise axis, the airfoil, in one embodiment, comprises a substantially uninterrupted upper skin member defining the upper surface and being aerodynamically contoured to form a flow pattern over the upper surface to produce an upward lift.

There is a substantially uninterrupted lower skin member defining said lower surface. The lower skin member comprises a first forward lower surface portion extending rearwardly from the leading edge to a first inflection point. There is a second transitional lower surface portion extending rearwardly from the first surface portion at the first inflection point to curve concavely downwardly to a second inflection point. There is a third belly lower surface portion extending rearwardly from the second lower surface portion at the second inflection point to curve convexly to form a downwardly expanded belly portion of said airfoil. There is a fourth trailing edge lower surface portion extending from the third lower surface portion to the trailing edge.

The lower surface portions are contoured to form a flow pattern where flow along the first and second lower surface portions is at a relatively average lower velocity. The flow along the third lower surface portion is at a relatively higher average velocity, in a manner that relatively greater lifting force is exerted at the first and second lower surface portions, and relatively less lifting force is exerted at the third lower surface portion.

·There is a primary load bearing structure located primarily in the belly section of the airfoil. Thus, the airfoil is aerodynamically contoured to function effectively aerodynamically, and yet provide relatively greater airfoil thickness at the belly section to enable the primary load carrying structure to have a relatively large height dimension.

In a preferred embodiment, the third and fourth lower surface portions meet at a third inflection point, and the fourth lower surface portion curves concavely toward said trailing edge. In another configuration, the fourth lower surface portion extends from the third lower surface portion to the trailing edge without concave curvature.

In one embodiment, the airfoil is mounted to a body, and the airfoil has an inboard end and an outboard end. The chord-wise location is positioned at the inboard end of the airfoil, and the lower surface belly portion diminishes in thickness in an outboard direction.

In another embodiment, the airfoil is generally symmetrical in cross-section along a substantial portion of the spanwise axis. Thus, the chord-wise location extends along said substantial portion of the spanwise axis, whereby the expanded belly section is present along said substantial portion of the chord-wise axis.

Desirably, the second inflection point is located rearwardly from the leading edge at a distance between one-quarter to four tenths of a chord length of the airfoil at the chord-wise location. Also, the airfoil is desirably contoured so that, at a distance from the leading edge equal to about one-tenth of a chord length at the chord-wise location, the airfoil has a thickness dimension which is between about 0.35 and 0.55 of a maximum thickness dimension of the airfoil at the belly section. Desirably, this dimension is about 0.45 of the maximum thickness dimension. At a distance of about two-tenths of chord length from the leading edge, the airfoil has a thickness dimension which is between about 0.5 and 0.72 of the maximum thickness of the airfoil. Desirably, this dimension would be about six-tenths of maximum airfoil thickness. At the second inflection point, the airfoil thickness would be between about 0.7 and 0.88 of maximum airfoil thickness, with this dimension desirably being between about 0.74 to 0.81.

Desirably, the second transitional lower surface portion has a chord-wise dimension which is between about 8% to 25% of the chord length at the chord-wise location. Preferably, this chord-wise dimension would be about three-twentieths of the chord length.

The leading edge of the airfoil should have a radius of curvature which is no greater than about 1.5% of chord length at the chord-wise location.

Preferably, this radius would be no greater than about 1% of the chord length at the chord-wise location.

In yet another embodiment, the upper and lower surfaces of the airfoil each have first, second, third and fourth surface portions as described above. Thus, the belly surface portions at the two surfaces each expand outwardly from the chord-wise axis. Desirably, the upper and lower surfaces are formed symmetrically about the chord-wise axis. Further, in the preferred form, this airfoil is used as a control surface and is mounted for rotation about an axis generally aligned with the spanwise axis of the airfoil. Desirably, the axis of rotation passes through the primary load carrying structure of the airfoil.

An aircraft made according to the present invention has a central body and two wings attached thereto on opposite sides of the body. The expanded belly section of each wing is at the inboard ends of the wings, with the belly section tapering in height in an outboard direction.

Other features of the present invention will become apparent from the following detailed description.

BRIEF DESCRIPTION OF THE DRAWING

FIGS. 11a–11c illustrate theoretical design pressure distribution for the wind tunnel model for an airfoil incorporating the present invention, used to develop the wind tunnel pressure data points shown in FIGS. 10a–10c, with FIG. 11a illustrating the cross-sectional configuration of the airfoil at eleven equally spaced spanwise locations, beginning at the inboard end at the top of FIG. 11a, with the outboard end being shown at the bottom of FIG. 11a; FIG. 11b showing the pressure distribution for high angle of attack for each cross-sectional location, and FIG. 11c showing pressure distribution for low angle of attack for each cross-sectional location;

FIG. 13c is an enlarged cross-sectional view illustrating the preferred aerodynamic shape of the two airfoils of FIG. 13a.

DESCRIPTION OF THE PREFERRED EMBODIMENTS

It is believed that a greater appreciation of the present invention can be achieved by first discussing the present state of the art in high performance transonic airfoils. Aerodynamic development of high speed wings generally can be characterized by the quest for maximum foil section thickness and lifting capability without undue impairment of the wing drag. The special problems to be solved are:

(a) limiting maximum velocity of the fluid to speeds not much above the speed of sound (avoidance of strong shocks), and also avoidance of cavitation, (b) providing velocity gradients along the foil contour such that flow separation is avoided or minimized, (c) selecting the best combination of foil thickness and design lift coefficient for the vehicle's operating envelope.

A major consideration in the design of airfoils is that for conventionally shaped foil sections, an increase in the foil section maximum thickness is associated with an increase in overall foil cross-section area, referred to as "foil volume". Generally, foil section maximum lift capability is decreased when the volume is increased, because the foil upper surface maximum velocity is limited by Mach number considerations. Foil thickness is generally only beneficial in the vicinity of the leading edge, since it adds to the airfoil's tolerance to excursions in flow angle of attack.

Figure 1:
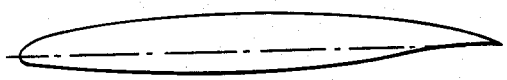
FIG. 1 is a sectional view showing the outline of a conventional current technology transonic airfoil.

In FIG. 1, there is shown the cross-sectional shape of a high performance transonic airfoil incorporating present state of the art technology. Such transonic sections utilize what is commonly referred to as "aft loading" where a sizeable amount or the lift is carried at the aft concave lower region of the wing. Carrying lift aft reduces the amount of lift to be carried by the rest of the airfoil, allowing extra foil thickness in this region without an increase in maximum velocity. Aft loading has a serious disadvantage, in that it causes a strong nose-down pitching moment which, in many cases, negates the structural gains obtained from the aft loading related foil thickness increase.

Figure 2:
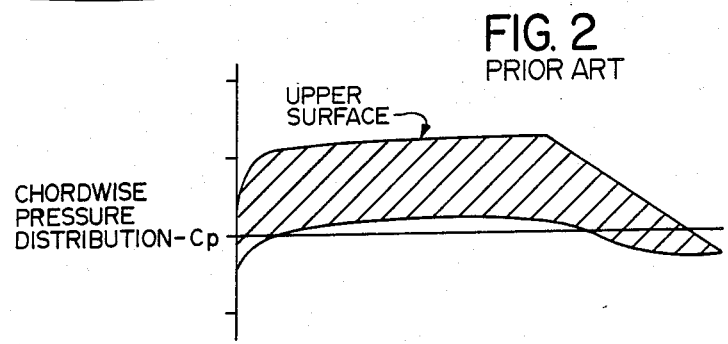
FIG. 2 is a graph illustrating the pressure coefficients developed by the airfoil of FIG. 1 when operating at moderate angle of attack.

In the graph of FIG. 2, there is shown the pressure distriburion over tne upper and lower surfaces of the prior art airfoil of FIG. 1. With respect to the upper surface, it can be seen that the upper pressure curve rises abruptly from the leading edge and remains substantiaily constant over the larger portion of the upper surface. Then the upper pressure curve declines gradually over the aft portion of the upper surface. The pressure curve along the lower surface remains more nearly constant, and slopes moderately downwardly at the aft end of the airfoil to meet the pressure curve of the upper surface.

The configuration of FIG. 1 shows what is quite close to an optimized configuration of a high performance transonic airfoil. If the overall dimensions of the airfoil of FIG. 1 were changed so that the airfoil were substantially thicker, while maintaining the same overall cross-sectional configuration, it would be found that the pressure curves would be such that the pressure curve over the lower surface would be closer to that of the upper surface, thus indicating an overall decrease in the lift which would be generated.

Figure 3:
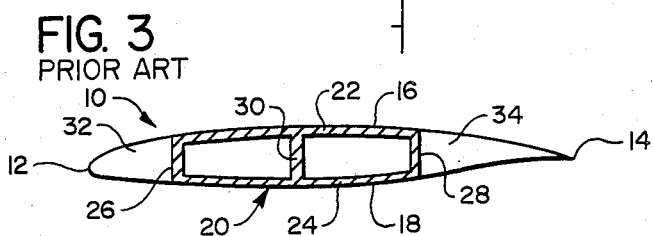
FIG. 3 is a view similar to FIG. 1, illustrating somewhat schematically in cross-section the primary load carrying structure of the wing of FIG. 1.

With regard to the structural aspects of the prior art airfoil of FIG. 1, reference is made to FIG. 3, which shows somewhat schematically the cross-sectional configuration of a spar which would be the primary load carrying member of the airfoil. This airfoil is designated 10, and has a leading edge 12, a trailing edge 14, an upper surface 16, and a lower surface 18. The spar 20 has a general box-like structure, made up of an upper plate 22, a lower plate 24, a front plate 26, a rear plate 28, and an intermediate plate 30. It can be seen that the four plates 22-28 form a generally box-like configuration, with the middle plate 30 providing additional structural strength and reaching between the upper and lower plates 22 and 24.

Between the leading edge 12 and the front plate 26, there is a leading edge non-structural region 32, and between the trailing edge 14 and the rear plate 28, there is a trailing edge non-structural region 34. As indicated earlier herein, the "non-structural regions" have sufficient structure to transmit local airload shear and moment in a chord-wise direction to the spar 20. While the spar 20 is not drawn precisely to scale relative to the overall dimensions of the airfoil 10, it can be seen generally that the width dimension of the spar (i.e. the dimension parallel to the chord-wise axis) must be made relatively large so as to limit the volume of the leading edge and trailing edge regions 32 and 34.

Figure 4:
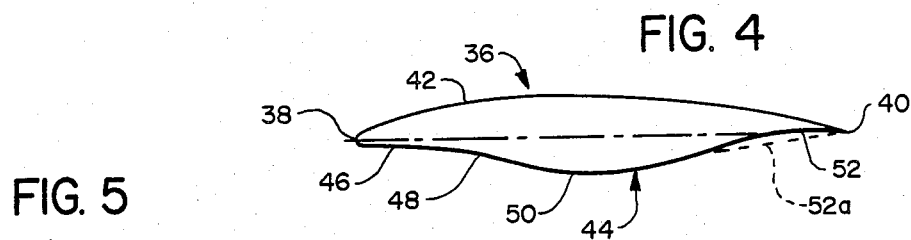
FIG. 4 is a sectional view similar to FIG. 1, illustrating generally the cross-sectional shape of the airfoil of the present invention.

With the foregoing discussion of the high performance rransonic airfoil being presented generally as background information, reference is now made to FIG. 4 which shows in general outline the cross-sectional configuration of an airfoil 36, made in accordance with the present invention. This airfoil has a nose or leading edge 38, a trailing edge 40, an upper surface 42, and a lower surface which is generally designated 44. The lower surface 44 can be considered as having a forward leading edge surface portion 46, a transition surface portion 48, a belly surface portion 50, and a trailing edge portion 52. While the contours of the lower surface 44 will be described more specifically later herein, it can be stated generally that the portion of the airfoil 36 adjacent the forward lower surface portion 46 is made with a relatively small thickness dimension, while the middle airfoil section at the area of the lower belly surface portion 50 is made relatively thick. The forward portion 46 is substantially planar and extends generally parallel to the chord line, while the transition portion 48 is curved concavely in a downward direction. The belly surface portion 50 is convexly curved to expand downwardly. In the specific configuration shown herein, the lower trailing edge surface portion 52 is convexly curved. However, within the broader scope of the present invention, it is possible to modify the configuration of a trailing edge portion 52 so that it more nearly approximates a straight line, or even conceivably a possibly moderately convex curve.

Figure 5:
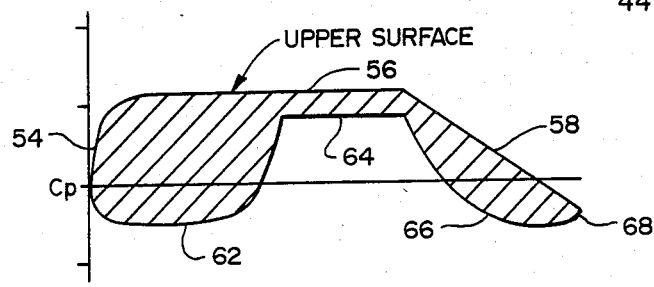
FIG. 5 is a graph similar to FIG. 2, but showing the pressure distribution over the airfoil of FIG. 4 at a moderate angle of attack.

With regard to the aerodynamic characteristics of the airfoil 36 of the present invention, reference is made to FIG. 5, which is a somewhat idealized representation of the pressure curves. It can be seen that the pressure curve for the upper surface is shaped generally in the same manner as the upper surface pressure curve shown in FIG. 2 relative to the conventional airfoil of FIG. 1. Thus, the pressure curve arises abruptly at 54 near the leading edge, and then remains substantially constant over the forward and middle upper surface portions, as at 56. The pressure curve for the upper surface then slopes downwardly over the trailing edge upper surface portion, as at 58.

With regard to the pressure curve for the lower surface, it can be seen that very close to the leading edge there may be a peak pressure point at 60 at low angle of attack, and from that point 60 the pressure curve remains substantially constant at 62 over the leading edge lower surface portion 46 and transition surface portion 48 at high angles of attack, but for low angles of attack curves downwardly from the leading edge peak. However, as the air flows around the belly surface portion 50, it increases in velocity so that static pressure decreases, as indicated by the substantially flat curve portion 64. The pressure curve from the belly surface portion 50 slopes downwardly at 66 toward a terminal point 68 where it meets the trailing edge portion 58 of the upper pressure curve.

The shaded area between the upper and lower curves in FIG. 5 represents the aerodynamic lifting force exerted on the airfoil 36. It can be seen that a substantial portion of the lift force is exerted on the forward portion of the airfoil 36, while the middle portion is more lightly loaded. This reduces nose down pitching moment so as to reduce undesired aeroelastic deformation of the wing.

Figure 6:
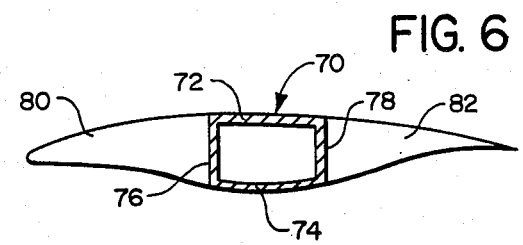
FIG. 6 is a view similar to FIG. 3, showing somewhat schematically primary load carrying structure of the airfoil of the present invention.

With regard to structural considerations, reference is made to FIG. 6, where there is shown a spar 70, made up of an upper plate 72, a lower plate 74, a forward plate 76 and a rear plate 78. The four plates 72-78 are arranged in a generally box-like configuration. Comparing the spar structure of FIG. 6 to that of FIG. 3, it can be seen that the spar structure 70 of the airfoil 36 of the present invention is positioned primarily in the belly region of the airfoil, and that the width dimension (i.e. the dimension parallel to the chord-wise axis) is relatively small. This is possible, since the height of the spar 70 can be increased substantially from the spar height of the configuration of FIG. 3, due to the presence of the belly portion in the airfoil 36. It can also be seen that the value of the non-structural region 80 of the leading edge can be made substantially larger than that of the corresponding leading edge non-structural region 32 of the airfoil of FIG. 3. Likewise, the volume of the trailing edge non structural region 82 can be made larger than that of the corresponding trailing edge non-structural region 34 of the airfoil of FIG. 3.

Normally. the upper and lower plates 72 and 74 will be positioned directly adjacent to (or very close to) the upper and lower skin portions of the airfoil 36. Further, it is to be understood that the cross-sectional configuration of the spar 70 is shown somewhat schematically, and obviously, the precise configuration of the spar 70 could be varied to meet the precise structural requirements of the airfoil 36.

Figure 7:
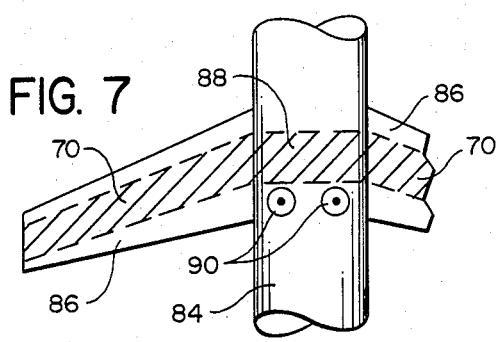
FIG. 7 is a top plan view of an airplane illustrating the location of the wing primary structure and the carry-through structure in the fuselage.

A manner of incorporating the teachings of the present invention in an airplane of overall conventional design is shown in FIG. 7, which is a top plan view of a portion of an aircraft. There is a fuselage 84, and a pair of wings 86. The spar 70 is shown in broken lines mounted within the wing 86, and it can be seen that the inboard end of each spar 70 connects to a carry-through structural portion 88, which extends across the fuselage 84 to connect to the spar 70 of an opposite wing 86 (only a portion of which is shown). Since the two spars 70 have relatively small width dimensions, the width dimension of the carry-through portion 88 can also be made relatively small. This would permit space in the fuselage to be utilized for some other purpose. For example, it would possibly leave extra room to stow landing gear within the fuselage. For purposes of illustration, portions of the landing gear are shown schematically at 90, where it can be seen that these can be placed in the fuselage immediately aft of the carry-through structure 88.

Figure 8E:
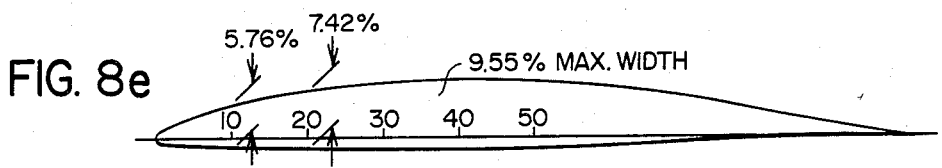
FIGS. 8a–8e illustrate the cross sectional shapes of one of the wings of FIG. 7, with FIG. 8a being at the extreme inboard location, FIG. 8e at the extreme outboard location, and FIGS. 8b, 8c, and 8d showing the cross-section at equally spaced locations from the inboard to the outboard end of the wing.
Figure 8D:
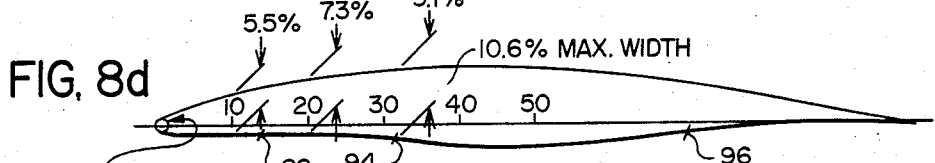
Figure 8C:
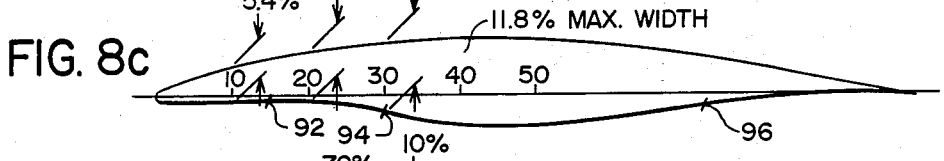
Figure 8B:
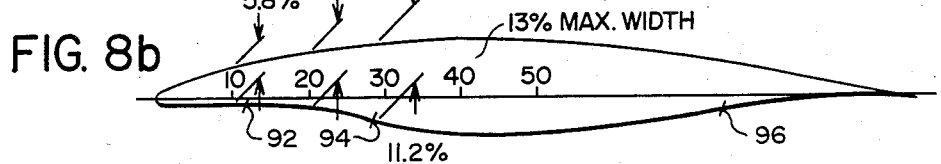
Figure 8A:
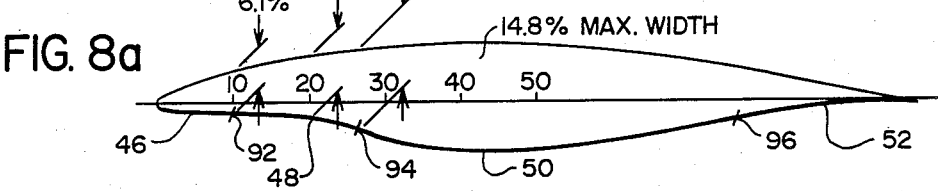

When the airfoil of the present invention is used in a conventional wing of an aircraft, such as shown at 86 of FIG. 7, the bending moment on the spar 70 is at a maximum at the root end (i.e. the inboard end), and diminishes outwardly toward the wing tip. Accordingly, the height of the spar 70 can be diminished from the root of the wing toward the wing tip. Thus, since the increased wing thickness is not needed to accommodate the depth of the spar 70 as it extends further outboard, it is possible to diminish the total thickness of the wing and thus decrease the amount of the protrusion of the belly surface portion 50. This is illustrated in FIGS. 8a-e, where FIG. 8a shows the airfoil cross-section at the root, while FIG. 8e shows the airfoil configuration at the tip. FIG. 8b is the cross-section at the 25% spanwise location from the root; FIG. 8c is the cross-sectional configuration at the midspan of the wing 86; and FIG. 8d is the cross-sectional configuration at the 75% spanwise location from the wing's root. These sections of FIGS. 8a-e are taken parallel to the free stream.

For purposes of illustration, the chord length is shown as being constant throughout FIGS. 8a-e. However, it is to be understood, as shown in FIG. 7, the chord length could be diminished in an outboard direction to form a tapered wing.

With regard to the precise contouring of the airfoil sections shown in FIGS. 8a-e, there have been shown three inflection points at 92, 94 and 96, respectively. The first inflection point 92 is where the forward substantially straight leading edge lower surface portion 46 meets the concavely curved transition portion 48. The second inflection point 94 is where the concave curve of the transition portion 48 changes to the convex curvature of the belly surface portion 50. Finally, the inflection point 96 is where the convex curve of the belly surface portion 50 reverses itself to form the moderately concave trailing edge lower surface portion 52.

In FIG. 8a, it can be seen that the first inflection point 92 is at or just slightly forward of the 10% chord length; the second inflection point 94 is at approximately 26-27% chord length; and the third inflection point 96 is at about 78% chord length.

In FIG. 8b, the inflection points 92 and 94 are moved moderately rearwardly to, respectively, 11% and 29% chord length. At FIG. 8c, these two points 92 and 94 have moved to about 12% and 30% chord length, respectively, and at FIG. 8d, these two points 92 and 94 have moved to about 12.5% and 31.5% chord length, respectively. Finally, at FIG. 8e, the belly surface portion 50 has disappeared entirely.

The thickness dimension at 10% chord length, at 20% chord length, at inflection point 94, and at maximum thickness location are given in FIGS. 8a-8e as a percentage of chord length.

Figure 9:
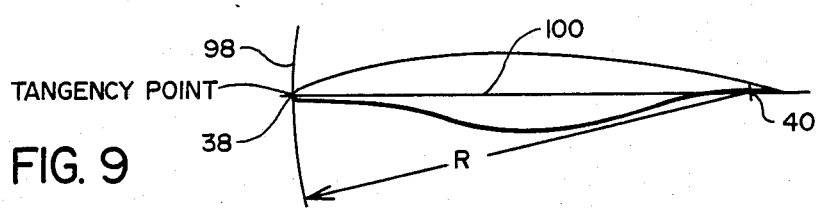
FIG. 9 is a cross-sectional view of an airfoil made in accordance with the present invention, and illustrates the manner in which the chord line of an airfoil is defined in accordance with the description herein.

To indicate the meaning of the term "chord line" as used in the present invention, reference is made to FIG. 9. First, an arc 98 of a circle is drawn, using the trailing edge point 40 as a center, with the circular arc 98 being tangent to the leading edge 38. The chord line is that line which is drawn from the point of tangency at the leading edge 38 to the trailing edge point 40.

Figure 10C:
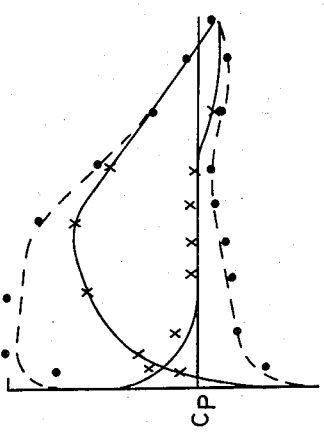
FIGS. 10a–10c show three chord sections at locations along the spanwise axis of the wing, and further show corresponding graphs illustrating the pressure distribution over that particular section for both high and low angles of attack with the points being wind tunnel surface pressure measurements on the wind tunnel model.
Figure 10B:
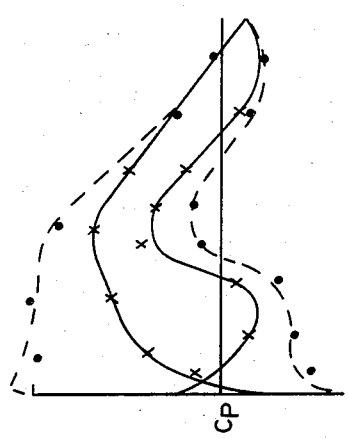
Figure 10A:
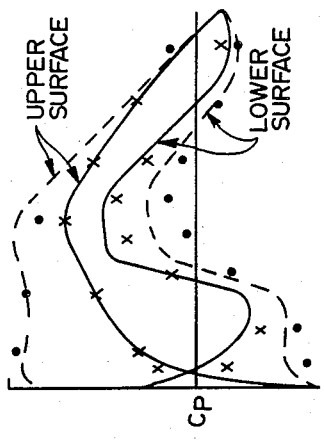

To illustrate the pressure distribution over the airfoil 36, reference is made to FIGS. 10a-10c, which show pressure points from wind tunnel testing. Each of these FIGS. 10a-10c show first of all chord-wise location of the airfoil section, then cross-sectional contour at that location, and then a graph illustrating pressure distribution for low angle of attack and a high angle of attack conditions. The broken lines indicate high angle of attack conditions, while the solid lines indicate low angle of attack conditions. With regard to specific design configurations, the airfoil 36 needs to be designed for two design conditions, namely high and low angle of attack. For low angle of attack conditions, at the lower surface leading edge the air reaches a high velocity and then is decelerated until it approximately reaches the inflection point 94 between the transition surface portion 48 and the belly surface portion 50 (see FIG. 10a). Shaping of this recovery is critical to performance at this low angle of attack, where the problem is to avoid or limit separation. For maximum low angle of attack performance, the lower surface portions 46 and 48 are shaped to yield a velocity starting with a high value at the leading edge and decelerating, as rapidly as possible, but without encountering significant flow separation, to a relatively low velocity. This low velocity region is followed, near the inflection point 94, by a very rapid acceleration of the flow to a velocity which is typically higher than free stream velocity, this accelerated flow being around the belly surface portion 50.

Rearwardly of the belly surface portion 50, the shape of the aft lower surface portion 52 may be, within the broader aspects of the present invention, either concave or convex. If the shape of the surface portion 52 is concave, which presently is believed to be the preferred configuration for most applications, there will be the inflection point 96, where curvature changes from convex to concave. The maximum amount of concavity of the aft lower surface region 52 is limited by the requirement that the flow not separate to any large extent at the low angle of attack design condition.

At the second design condition (i.e. for high angle of attack), the forward surface portions 46 and 48 between the leading edge and the inflection point 94 experience a low, nearly constant velocity, followed again by a very sharp velocity rise at the onset of the lower belly surface portion 50. The characteristics of the lower surface velocity distribution at the high angle of attack condition do not dictate the lower surface shaping. Rather, they are a fallout of the low angle of attack design condition, which, as indicated above, was shown to be critical to the lower surface.

In order to demonstrate the aerodynamic benefits derived from the present invention, an untapered wing of 30° sweep was designed and wind tunnel tested. The designed pressure distributions are shown in FIGS. 11a-11c. FIG. 11a shows eleven equally spaced spanwise locations, with the top cross-sectional shape indicating the configuration at the root of the wing, and the lowermost cross sectional shape showing the configuration at the tip of the wing. The pressure distribution curves shown in FIG. 11b represent pressure distribution at a high angle of attack mode of operation. The pressure curves shown in FIG. 11c show pressure distribution for low angle of attack mode of operation.

With regard to the configuration of the upper surface 42, the contour will generally be relatively close to the contour of the upper surface of a conventional airfoil, such as shown in FIG. 1. However, there are some special considerations, primarily because of the relatively small radius of curvature at the leading edge 38. At high angle of attack, a limiting factor is the maximum local velocity at the forward portion of the upper surface 42, in order avoid strong shocks due to local supersonic flow. At the upper surface aft end, the pressure gradient is limited again by boundary layer flow separation criteria. The object of the design is to obtain low drag over a large range of lift and angle of attack.

It is to be understood that the upper and lower surfaces 42 and 44 of the airfoil 36 are substantially uninterrupted surfaces so that the flow immediately adjacent the surfaces is not artificially induced laminar flow (e.g. laminar flow induced by suction). However, in many cases, there will be natural laminar flow present. This is in contrast to airfoils having suction slots over substantial surface portions to generate laminar flow. The design considerations for such suction laminar flow airfoils are in certain respects quite different from the considerations relevant to the present invention.

With regard to the geometry of the airfoil of the present invention, the lower belly surface portion 50 extends below the foil chord line 100. Forward of the belly surface portion 50, the surface curvature has, as indicated previously, two inflection points 92 and 94. There may be additional inflection points between the points 92 and 94, but as a general proposition, these would have no substantial significance in the present invention. In the preferred embodiment, the second inflection point 94 is located no closer than 25% chord length (i.e. one quarter chord length) to the leading edge 38, but no further away than 40% chord length (i.e. four tenths chord length) from the leading edge 38. The preferred embodiment has the inflection point 94 located at about 30% of the chord length. The overall length of the transition region 48 from the forward inflection point 92 to the rear inflection point 94 would generally be no longer than approximately 25% of the chord length (i.e. one quarter chord length). The preferred value would be in the vicinity of about 15% of the chord length.

At a location at 10% chord length (measured from the leading edge 38 and indicated at "a" in FIG. 8a), the ratio of the local thickness to maximum thickness would be less than about 0.55, and may reach a value as low as 0.35. In the preferred embodiment, this ratio is approximately 0.45. At 20% chord length (measured from the leading edge 38 and indicated at "b" in FIG. 8a), the ratio of local thickness to maximum thickness would be less than about 0.72, but more than 0.50, with the preferred value being about 0.60. At the inflection point 94, the ratio between local thickness (indicated at "c" in FIG. 8a) to maximum thickness of the airfoil 36 would be less than about 0.88, but greater than about 0.7. The preferred value would be closer to 0.77.

The trailing edge of the airfoil 36 may be pointed or blunt. If the trailing edge is blunt, the foil thickness at 98% chord length would generally be less than 2% of the chord length. The leading edge radius of curvature would generally be less than 1.5%, with the preferred value being about 1%. (This 1% radius is illustrated in FIG. 8c.) This relatively small leading edge radius of curvature has the added benefit of enhancing deicing. Within the broader scope of the present invention, if the airfoil were to be used for supersonic aircraft, the leading edge could be sharper.

Figure 12:
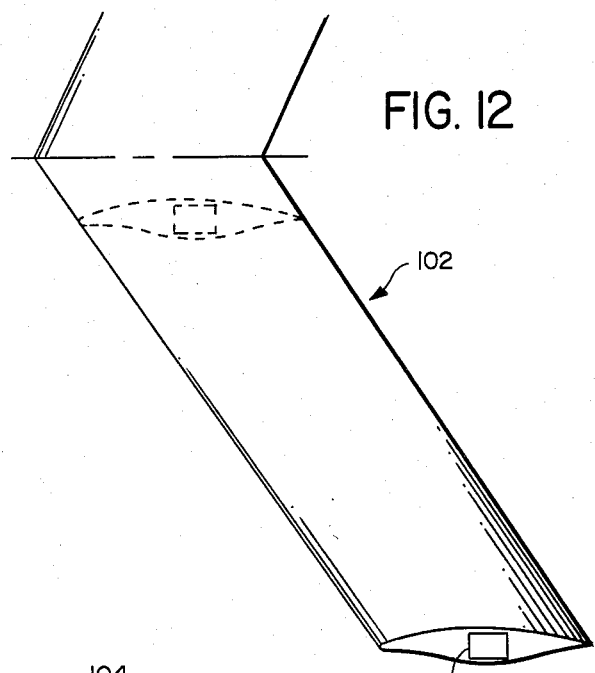
FIG. 12 is an isometric view illustrating somewhat schematically the present invention as employed in an airfoil which carries load along the length of the airfoil.

A second embodiment of the present invention is shown in FIG. 12, where there is an airfoil 102 having a main load carrying structure 104 extending the length of the airfoil 102. In this embodiment, the primary load carrying structure is a box-like structure having a hollow interior adapted to carry a load, such as cargo containers. The aerodynamic contours of the airfoil 102 would be generally the same as described previously, except that the belly surface region 50 would remain substantially constant along the length of the airfoil 102. For example, if the airfoil had substantially the same configuration as the airfoil cross-section shown in FIG. 8a, the belly surface portion 50 would remain extending a relatively larger distance below the chord line 100, and this configuration would remain substantially constant throughout the length of the airfoil 102. The configuration of FIG. 12 could be used, for example, in what is commonly called a "flying wing".

Figure 13A:
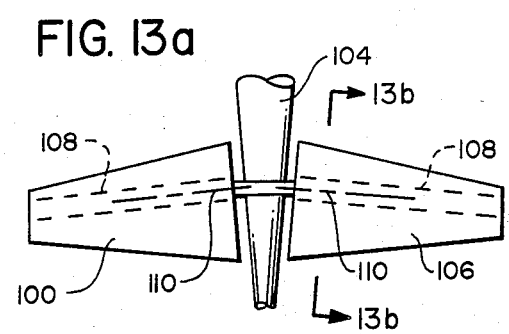
FIG. 13a is a top plan view illustrating a pair of airfoils of the present invention pivotally mounted to a central body and functioning as control surfaces.
Figure 13B:
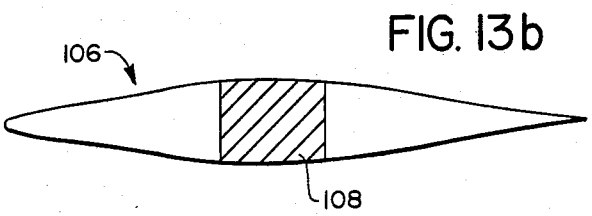
FIG. 13b is a cross-sectional view taken along lines 13b—13b of FIG. 13a, illustrating the primary load structure of the airfoil.
Figure 13C:
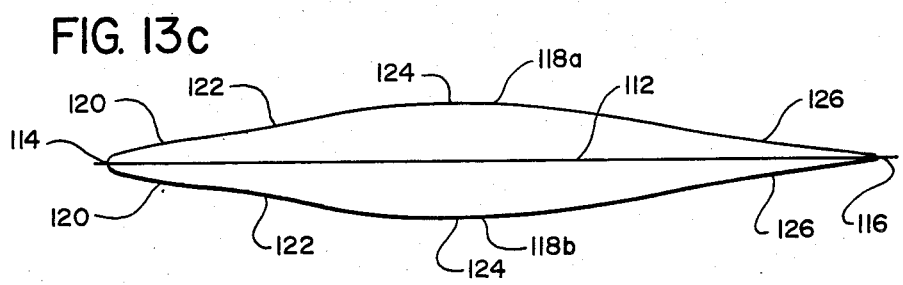

A third embodiment of the present invention is illustrated in FIGS. 13a through 13c. In FIG. 13a, there is shown a central body 105 having right and left airioils 106, with each airfoil having a spar structure 108. The two airfoils 106 are xounted for rotation about spanwise axes 110 which are located coincident with or very close to the spars 108. One of the airfoil sections 106 is illustrated in cross-sectional configuration in FIG. 13b. Since the two airfoils 106 are intended to be a control surfaces, required to generate both upward and downward lift, the airfoil is made substantially symmetrical about its chord-wise axis, indicated at 112 in FIG. 13c. However, for some applications these airfoils 106 could be made with a moderate amount of camber. More specifically, there is a leading edge 114, a trailing edge 116, an upper surface 118a and a lower surface 118b. The upper and lower surfaces 118a and 118b are substantially identical to one another. Accordingly, for each surface 118a and 118b, there is a forward surface portion 120, a transition surface portion 122, a belly surface portion 124, and a trailing edge surface portion 126, with these surface portions 120–126 being substantially the same for both surfaces 118a and 118b. However, the contours are modified to some extent from the configuration of the surface 44 of the first embodiment. For example, the forward surface portion 120 slants away from the chord-wise axis 112 in a rearward direction to a degree greater than what would occur relative to the forward lower surface portion 46 of the first embodiment. Further, the trailing edge portions 126 are, as shown herein, made with a very small degree of concave curvature.

It can be appreciated that with the foil section shown in FIG. 13c, the spar 108 can be made with a substantial thickness (i.e. vertical dimension), while the width dimension (i.e. that dimension parallel to the chord-wise axis 112) can be made quite small.

The present invention is particularly adapted to be used in conjunction with airfoils, particularly airfoils designed to fly at relatively high subsonic speeds (i.e. Mach 0.5 or more). However, it is to be understood that within the broader scope of the present invention, the present invention could, for some applications, be used advantageously for airfoils which travel at lower subsonic speeds.

Also, within the broader scope of the present invention, it is possible that the foil configuration shown herein could be used in other applications, such as a hydrofoil. However, the design considerations would differ to some extent. For example, the onset of cavitation in the liquid medium through which the hydrofoil travels would be a critical limiting factor of possibly greater significance. Accordingly, it is contemplated that to the extent that the claims of the present invention can be interpreted more broadly to cover hydrofoil applications or other foil applications where the foil moves through a fluid medium, it is intended that the term "airfoil" would be interpreted more broadly to include other foil applications where the foil moves through a fluid medium other than air. However, it is to be understood that the present invention is uniquely adapted to be used in an airfoil application and is particularly adapted to solve design problems related directly to airfoils as used in the more limited sense.

It is to be understood that the particular configurations shown herein are not intended to be limiting, and that modifications could be made within the teachings contained herein, without departing from the broader teachings of the present invention.

I claim:

1. An airfoil having a leading edge, a trailing edge, an upper surface, a lower surface, a chord-wise axis and a spanwise axis, said airfoil comprising at a chord-wise location on said spanwise axis:
   a. a substantially uniterrupted upper skin member defining said upper surface and being aerodynamically contoured to form a flow pattern over the upper surface to produce an upward lift;
   b. a substantially uniterrupted lower skin member defining said lower surface, said lower skin member comprising:
      1. a first forward lower surface portion extending rearwardly from said leading edge to a first inflection point;
      2. a second transitional lower surface portion extending rearwardly from said first surface portion at said first inflection point to curve concavely downwardly to a second inflection point, said second inflection point being located rearwardly from said leading edge at a distance between one-quarter to four-tenths of a chord length of said airfoil at said chord-wise location;
      3. a third belly lower surface portion extending rearwardly from said second lower surface portion at said second inflection point to curve convexly to form a downwardly expanded belly section of said airfoil;
      4. a fourth trailing edge lower surface portion extending from said third lower surface portion to said trailing edge;
   c. said lower surface portions being contoured to form a flow pattern where flow along said first and second lower surface portions is at an average lower velocity, and flow along said third lower surface portion is at a relatively higher average velocity, in a manner that relatively greater lifting force is exerted at the first and second lower surface portions, and relatively less lifting force is exerted at the third lower surface portion;
   d. a primary load bearing structure located primarily in the belly section of the airfoil;
   whereby said airfoil is aerodynamically contoured to function effectively aerodynamically, and yet provide relatively greater airfoil thickness at said belly section to enable said primary load carrying structure to have a relatively large height dimension.

2. The airfoil as recited in claim 1, wherein said third and fourth lower surface portions meet at a third inflection point, and said fourth lower surface portion curves concavely to said trailing edge.

3. The airfoil as recited in claim 1, wherein said fourth lower surface portion extends from said third lower surface portion to said trailing edge without concave curvature.

4. The airfoil as recited in claim 1, wherein said airfoil is mounted to a body, and said airfoil has an inboard end and an outboard end, said chord-wise location being positioned at the inboard end of said airfoil, and said lower surface belly portion diminishing in thickness in an outboard direction.

5. The airfoil as recited in claim 1, wherein said chord-wise location extends along a substantial portion of said spanwise axis, whereby said expanded belly section is present along said substantial portion of the chord-wise axis.

6. The airfoil as recited in claim 1, wherein said second inflection point is located rearwardly from said leading edge at a distance of about three-tenths of a chord length of said airfoil at said chord-wise location.

7. The airfoil as recited in claim 1, wherein said airfoil is contoured so that, at a distance from the leading edge equal to about one-tenth of a chord length at said chord-wise location, said airfoil has a thickness dimension which is between about 0.35 and 0.55 of a maximum thickness dimension of said airfoil at said belly section.

8. The airfoil as recited in claim 7, wherein said airfoil is contoured so that, at a distance from the leading edge equal to about one-tenth of a chord length at said chord-wise location, said airfoil has a first thickness dimension which is about 0.45 of a maximum thickness dimension of said airfoil at said belly section.

9. The airfoil as recited in claim 1, wherein said airfoil is contoured so that, at a distance from the leading edge equal to about two-tenths of a chord length at said chord-wise location, said airfoil has a thickness dimension which is between about 0.5 and 0.72 of a maximum thickness dixension of said airfoil at said belly section.

10. The airfoil as recited in claim 9, wherein said airfoil is contoured so that, at a distance from the leading edge equal to about two-tenths of a chord length at said chord-wise location, said airfoil has a thickness dimension which is about six-tenths of a maximum thickness dimension of said airfoil at said belly section.

11. The airfoil as recited in claim 1, wherein said airfoil is contoured so that a thickness dimension of said airfoil at said second inflection point is about 0.7 to 0.88 of a maximum thickness dimension of said airfoil at said belly section.

12. The airfoil as recited in claim 11, wherein said thickness dimension at the second inflection point is between about 0.74 to 0.81 of the maximum thickness dimension of the airfoil at the belly section.

13. The airfoil as recited in claim 1, wherein said second transitional lower surface portion has a chord-wise dimension which is between about 8% to 25% of chord length at said chord-wise location.

14. The airfoil as recited in claim 13, wherein said second transitional lower surface portion nas a chord-wise dimension which is about three-twentieths of chord length at said chord-wise location.

15. The airfoil as recited in claim 1, wherein the leading edge of the airfoil has a radius of curvature which is no greater than about 1.5% of chord length at said chord-wise location.

16. The airfoil as recited in claim 15, wherein the leading edge of the airfoil has a radius of curvature which is no greater than about 1% of chord length at said chord-wise location.

17. The airfoil as recited in claim 1, wherein:
a. said airfoil is contoured so that, at a distance from the leading edge equal to about one-tenth of a chord length at said chord-wise section, said airfoil has a first thickness dimension which is between about 0.35 and 0.55 of a maximum thickness dimension of said airfoil at said belly portion;
b. said airfoil is contoured so that, at a distance from the leading edge equal to about two-tenths of the chord length at said chord-wise location, said airfoil has a thickness dimension which is between about 0.5 and 0.72 of a maximum thickness dimension of said airfoil at said belly section, and;
c. said airfoil is contoured so that a third thickness dimension of said airfoil at said second inflection point is about 0.7 to 0.88 of a maximum thickness dimension of said airfoil at said belly section.

18. The airfoil as recited in claim 17, wherein:
a. said airfoil is contoured so that, at a distance from the leading edge equal to about one-tenth of a chord length at said chord-wise section, said airfoil has a first thickness dimension which is about 0.45 of a maximum thickness dimension of said airfoil at said belly portion;
b. said airfoil is contoured so that, at a distance from the leading edge equal to about two-tenths of the chord length at said chord wise location, said airfoil has a thickness dimension which is about two-tenths of a maximum thickness dimension of said airfoil at said belly section, and;
c. said airfoil is contoured so that a third thickness dimension of said airfoil at said second inflection point is between about 0.74 to 0.81 of a maximum thickness dimension of said airfoil at said belly section.

19. The airfoil as recited in claim 17, wherein:
a. said second transisitonal lower surface portion has a chord-wise dimension which is between about 8% to 25% of chord length of said chord-wise section;
b. the leading edge of the airfoil has a radius of curvature which is no greater than about 1.5% of chord length of said chord-wise location.

20. The airfoil as recited in claim 19, wherein:
a. said second inflection point is located rearwardly from said leading edge at a distance about three-thenths of the chord length of said airfoil at said chord-wise location;
b. said second transitional lower surface portion has a chord-wise dimension which is about three-twentieths of chord length of said chord-wise section;
c. the leading edge of the airfoil has a radius of curvature which is no greater than about 1% of chord length of said chord-wise location.

21. An airfoil having a leading edge, a trailing edge, an upper surface, a lower surface, a chord-wise axis and a spanwise axis, said airfoil comprising at a chord-wise location on said spanwise axis:
a. a substantially uninterrupted upper skin member defining said upper surface and a substantially uninterrupted lower skin member defining said lower surface, each of said skin members comprising:
 1. a first forward surface portion extending rearwardly from said leading edge to a first inflection point;
 2. a second transisitional surface portion extending rearwardly from said first surface portion at said first inflection point to curve concavely from said chord-wise axis to a second inflection point, each of said second inflection points being located rearwardly from said leading edge at a distance between one-quarter to four-tenths of a chord length of said airfoil at said chord-wise location;

3. a third belly surface portion extending rearwardly from said second surface portion at said second inflection point to curve convexly to form an expanded belly portion of said airfoil;

4. a fourth trailing edge surface portion extending from said third surface portion to said trailing edge;

b. each of said upper and lower surfaces being contoured to form a flow pattern where flow along said first and second surface portions is at an average lower velocity, and flow along said third lower surface portion of each surface is at a relatively higher average velocity;

c. a primary load bearing structure located primarily in the belly section of the airfoil;

whereby said airfoil is aerodynamically contoured to function effectively aerodynamically, and yet provide relatively greater airfoil thickness at said belly section to enable said primary load carrying structure to have a relatively large height dimension.

22. The airfoil as recited in claim 21, wherein said third and fourth surface portions of each surface meet at a third inflection point, and each of said fourth surface portions curves concavely to said trailing edge.

23. The airfoil as recited in claim 21, wherein each of said fourth surface portion extends from said third surface portion to said trailing edge without concave curvature.

24. The airfoil as recited in claim 21, wherein said airfoil is mounted to a body, and said airfoil has an inboard end and an outboard end, said chord location being positioned at the inboard end of said airfoil, with said belly section diminishing in thickness in an outboard direction.

25. The airfoil as recited in claim 21, wherein said airfoil is generally symmetrical in cross-section along a substantial portion of said spanwise axis, and said chord-wise location extends along said substantial portion of said spanwise axis, whereby said expanded belly section is present along said substantial portion of the chord-wise axis.

26. The airfoil as recited in claim 21, wherein each of said second inflection points is located rearwardly from said leading edge at a distance of about three-tenths of a chord length of said airfoil at said chord-wise location.

27. The airfoil as recited in claim 21, wherein said airfoil is contoured so that, at a distance from the leading edge equal to about one-tenth of a chord lengrh at said chord-wise location, said airfoil has a thickness dimension which is between about 0.35 and 0.55 of a maximum thickness dimension of said airfoil at said belly section.

28. The airfoil as recited in claim 21, wherein said airfoil is contoured so that, at a distance from the leading edge equal to about two-tenths of a chord length at said chord-wise location, said airfoil has a thickness dimension which is between about 0.5 and 0.72 of a maximum thickness dimension of said airfoil at said belly section.

29. The airfoil as recited in claim 21, wherein said airfoil is contoured so that a thickness dimension of said airfoil at said second inflection point is about 0.7 to 0.88 of a maximum thickness dimension of said airfoil at said belly section.

30. The airfoil as recited in claim 21, wherein said second transitional surface portions has a chord-wise dimension which is between about 8% to 25% of chord length at said chord-wise location.

31. The airfoil as recited in claim 21, wherein the leading edge of the airfoil has a radius of curvature which is no greater than about 1.5% of chord length at said chord-wise location.

32. The airfoil as recited in claim 21, wherein:
a. said airfoil is contoured so that, at a distance from the leading edge equal to about one-tenth of a chord length at said chord wise section, said airfoil has a first thickness dimension which is between about 0.35 and 0.55 of a maximum thickness dimension of said airfoil at said belly portion;
b. said airfoil is contoured so that, at a distance from the leading edge equal to about two-tenths of the chord length at said chord-wise location, said airfoil has a thickness dimension which is between about 0.5 and 0.72 of a maximum thickness dimension of said airfoil at said belly section, and;
c. said airfoil is contoured so that a third thickness dimension of said airfoil at said second inflection point is about 0.7 to 0.88 of a maximum thickness dimension of said airfoil at said belly section.

33. The airfoil as recited in claim 32, wherein:
a. each of said second transitional lower surface portions has a chord-wise dimension which is between about 8% to 25% of chord length of said chord-wise section;
b. the leading edge of the airfoil has a radius of curvature which is no greater than about 1.5% of chord length of said chord-wise location.

34. The airfoil as recited in claim 21, wherein said upper and lower surfaces are substantially symmetrically contoured about said chord-wise axis.

35. The airfoil as recited in claim 21, wherein said airfoil is mounted to a body about an axis of rotation generally aligned with the spanwise axis of the airfoil.

36. The airfoil as recited in claim 35, wherein said axis of rotation extends generally through the primary load bearing structure of the airfoil.

37. An aircraft comprising a central body, and a pair of oppositely extending airfoils, each airfoil having a leading edge, a trailing edge, an upper surface, a lower surface, a chord-wise axis and a spanwise axis, each airfoil having an inboard end and an outboard end, with the inboard end being connected to said body, each airfoil comprising:

a. a substantially uninterrupted upper skin member defining said upper surface and being aerodynamically contoured to form a flow pattern over the upper surface to produce an upward lift;

b. a substantially uninterrupted lower skin member defining said lower surface, said lower skin member comprising at the inboard end thereof:
1. a first forward lower surface portion extending rearwardly from said leading edge to a first inflection point;
2. a second transitional lower surface portion extending rearwardly from said first surface portion at said first inflection point to curve concavely downwardly to a second inflection point, said second inflection point being located rearwardly from said leading edge at a distance between one-quarter to four-tenths of a chord length of said airfoil at said chord-wise location;
3. a third belly lower surface portion extending rearwardly from said second lower surface portion at said second inflection point to curve convexly to form a dow-wardly expanded belly section of said airfoil, said belly section diminishing in thickness in an outboard direction;
4. a fourth trailing edge lower surface portion extending from said third lower surface portion to said trailing edge;

c. said lower surface portion being contoured to form a flow pattern where flow along said first and second lower surface portions is at an average lower velocity, and flow along said third lower surface portion is at a relatively higher average velocity, in a manner that relatively greater lifting force is exerted at the first and second lower surface portions, and relatively less lifting force is exerted at the third lower surface portion;

d. a parimary load bearing structure located primarily in the belly section of the airfoil and diminishing in height in an outboard direction;

whereby said airfoil is aerodynamically contoured to function effectively aerodynamically, and yet provide realtively greater airfoil thickness at said belly section at the inboard end of each airfoil to enable said primary load carrying structure to have a relatively large height dimension at said inboard end.

38. The aircraft as recited in claim 37, wherein said third and fourth lower surface portions of each airfoil meet at a third inflection point, and said fourth lower surface portion curves concavely to said trailing edge.

* * * * *